Aug. 14, 1962 J. D. BUSEY 3,049,112

GRINDER CONTROL MEANS

Filed June 6, 1960 5 Sheets-Sheet 1

INVENTOR.
James D. Busey,
BY Parker & Carter
Attorneys.

Aug. 14, 1962 J. D. BUSEY 3,049,112

GRINDER CONTROL MEANS

Filed June 6, 1960 5 Sheets-Sheet 2

INVENTOR.

James D. Busey,

BY Parker & Carter

Attorneys.

GRINDER CONTROL MEANS

Filed June 6, 1960

INVENTOR.
James D. Busey,
BY Parker & Carter
Attorneys.

Aug. 14, 1962 J. D. BUSEY 3,049,112

GRINDER CONTROL MEANS

Filed June 6, 1960 5 Sheets-Sheet 4

INVENTOR.
James D. Busey,
BY Parker & Carter
Attorneys.

Aug. 14, 1962
J. D. BUSEY
3,049,112
GRINDER CONTROL MEANS
Filed June 6, 1960
5 Sheets-Sheet 5
| POS | 1A 1B | 2A 2B | 3A 3B | 4A 4B | 5A 5B | 6A 6B | 7A 7B | 8A 8B | 9A 9B | 10A 10B | 11A 11B | 12A 12B | 13A 13B | 14A 14B | 15A 15B | 16A 16B | 17A 17B | 18A 18B | 19A 19B |
|---|---|---|---|---|---|---|---|---|---|---|---|---|---|---|---|---|---|---|---|
| 1 | X | | | | | | | | | | | | | | | | | | |
| 2 | | X | X | | | | | | | | | | | | | | | X | |
| 3 | | X | X | X | X | X | X | | X | | | | | | | | | X | |
| 4 | | X | X | | | X | X | | X | | X | | | | | | | X | |
| 5 | | X | X | | | X | X | X | | | X | | | | X | | | X | |
| 6 | | | | | | X | X | | | | | | X | X | | X | | X | |
| 7 | | | | | | X | X | | | | | | X | | | | X | X | |
| 8 | | X | X | X | X | X | X | | | X | | X | | | | | | X | |
| 9 | | X | X | X | X | | | | | X | | X | | | | | | X | |
| 10 | | X | X | | | | | X | | X | | | | | | | | | X |
| 11 | | | | | | | | | | | | | | | | | | | X |
| 12 | | | | | | | | X | | | | | | | | | | | X |
| LINE | 52 | 90 | 90 | 89 | 89 | 91 | 91 | 24 | 42 | 43 | 44 | 45 | 31 | 32 | 34 | 38 | 39 | 37 | 51 |
Fig. 6.
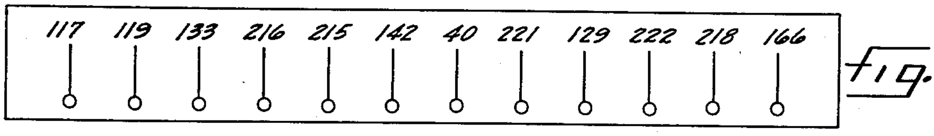
Fig. 7.
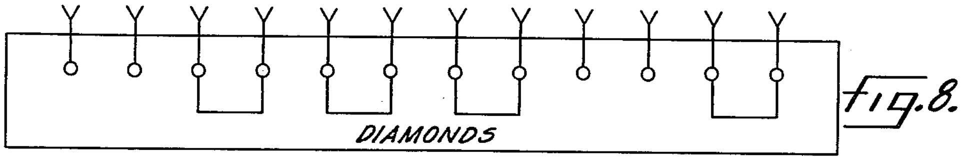
Fig. 8.
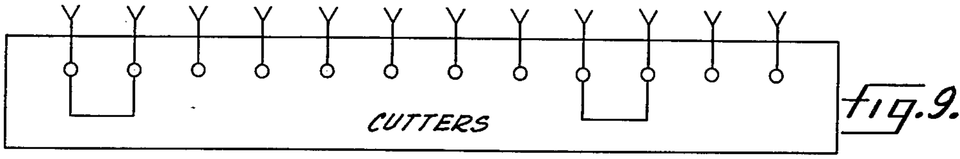
Fig. 9.
INVENTOR.
James D. Busey,
BY Parker & Carter
Attorneys.

United States Patent Office 3,049,112
Patented Aug. 14, 1962

3,049,112

GRINDER CONTROL MEANS

James D. Busey, South Beloit, Ill., assignor to Besly-Welles Corporation, South Beloit, Ill., a corporation of Illinois Filed June 6, 1960, Ser. No. 34,092
8 Claims. (Cl. 125—11)

This invention relates to a means and method for controlling the dressing of grinders, in particular double-disc grinders, and is a continuation-in-part of co-pending application Serial No. 836,353, filed August 27, 1959, of which I am a co-inventor.

One purpose of this invention is an improved dressing means for double-disc grinders or the like in which an accurate predetermined amount of abrasive is removed from each of the grinding faces.

Another purpose is an improved method of dressing grinding wheels or the like in which the amount of abrasive removed from the grinding face is accurately controlled.

Another purpose is an improved means for controlling the dressing operation of double-disc grinders whereby the amount of abrasive removed from each grinding face is accurately controlled so that the grinding wheels may be brought back to the proper spaced relationship for grinding.

Another purpose is a method of controlling the dressing operation of grinding wheels or the like in which the distance through which the grinding wheels move when transversing from a grinding position to a dressing position is measured so that the wheels may be returned through generally the same distance at the conclusion of the dressing operation.

Another purpose is an improved control means for the dressing and wheel changing operations of a double-disc grinder or the like.

Another purpose is an improved means for measuring the distance an axially moving grinding wheel transverses when moving to or from a dressing position.

Other purposes will appear in the ensuing specification, drawings and claims.

Figure 1:
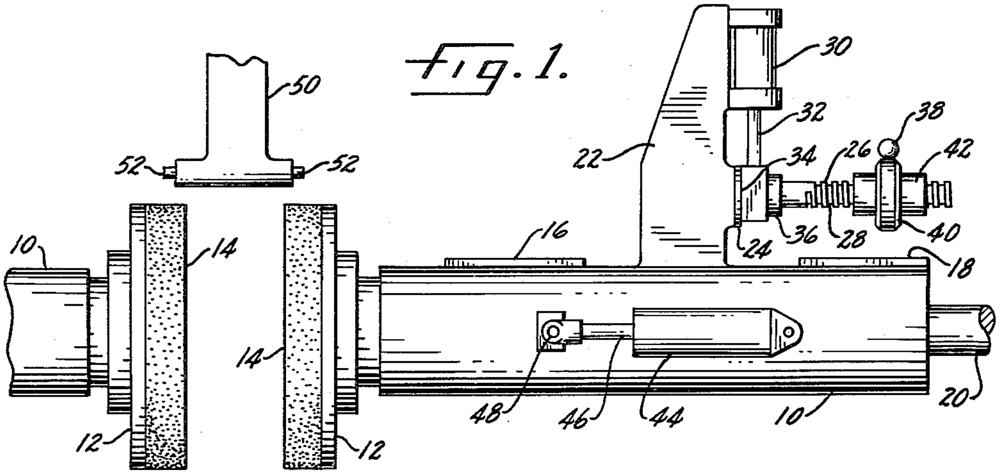
Figure 2:
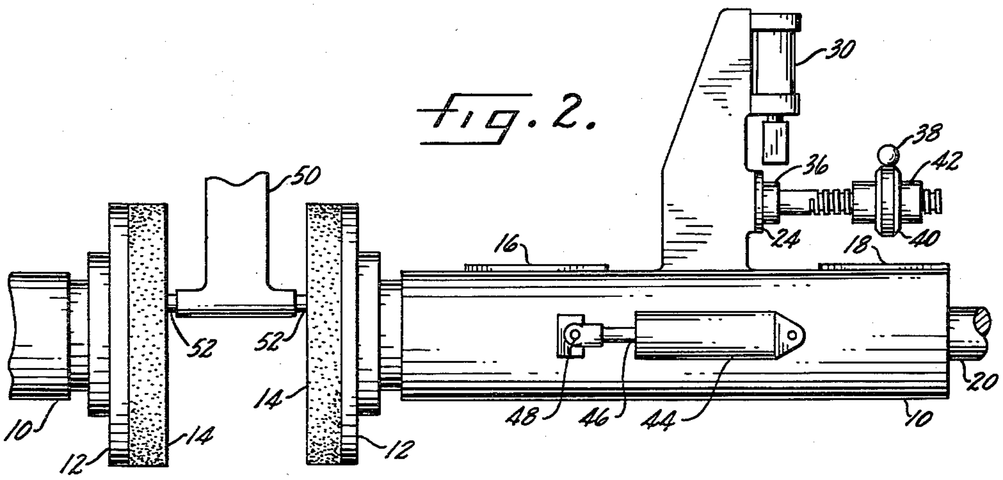
Figure 3:
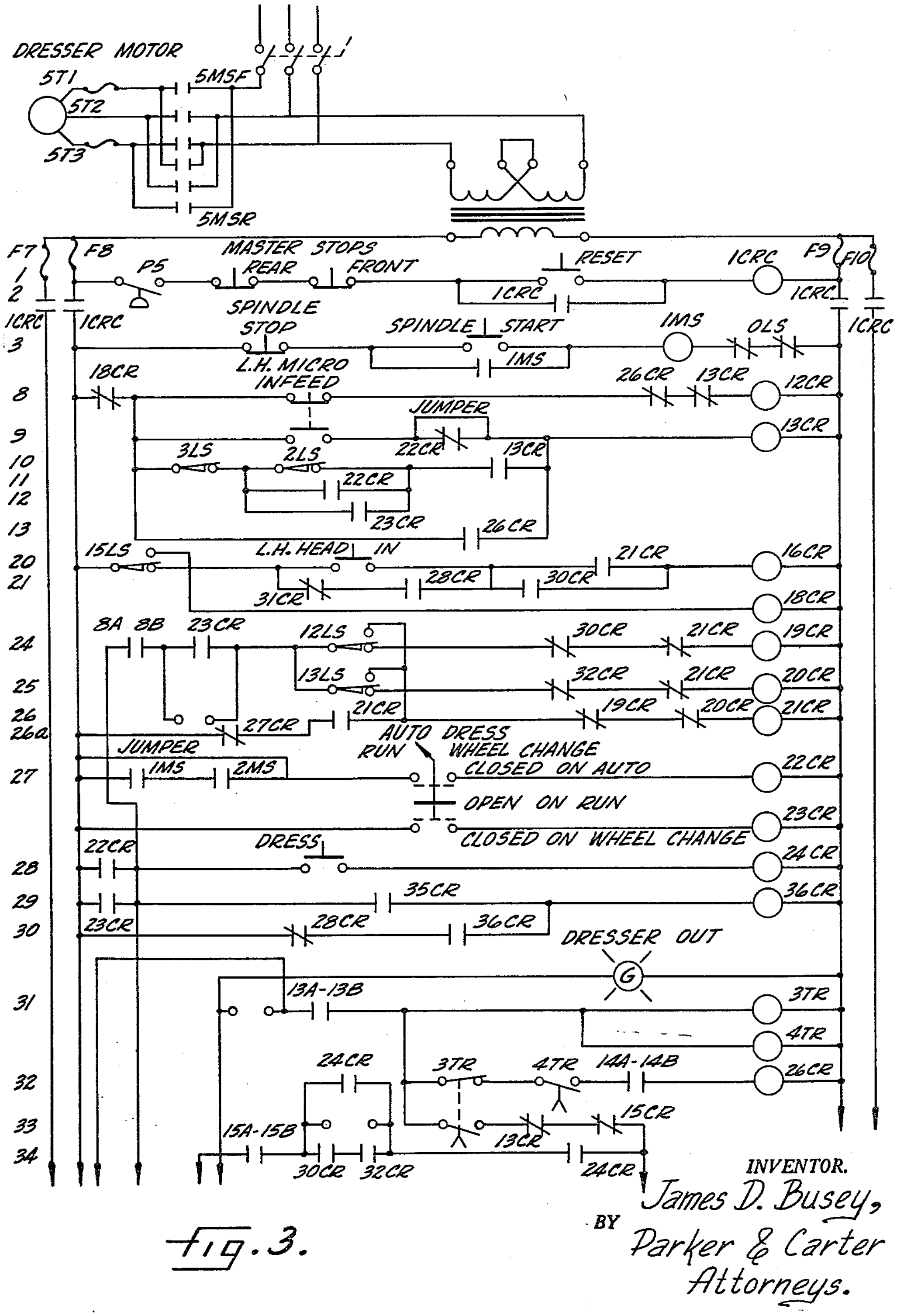
Figure 4:
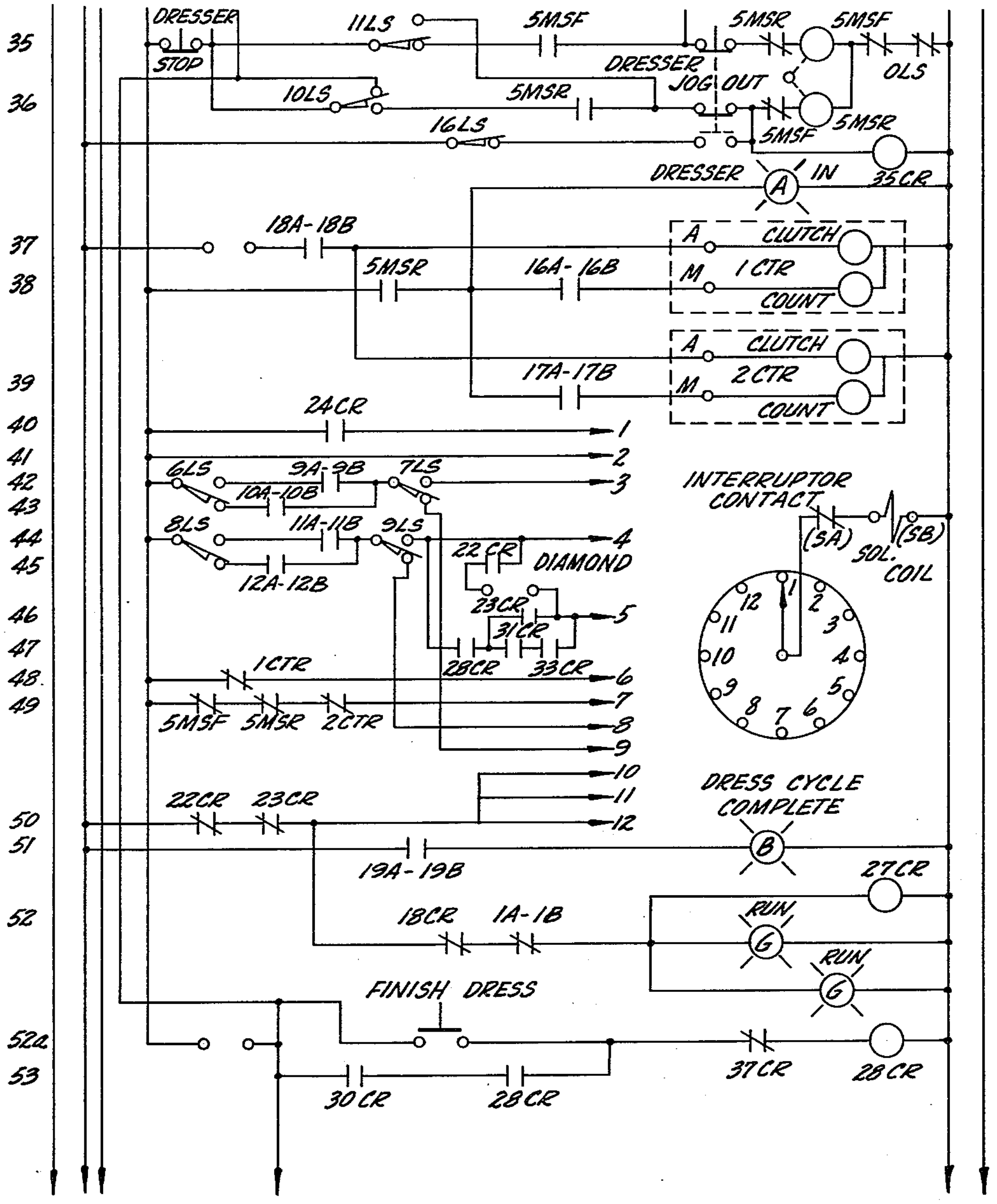
Figure 5:
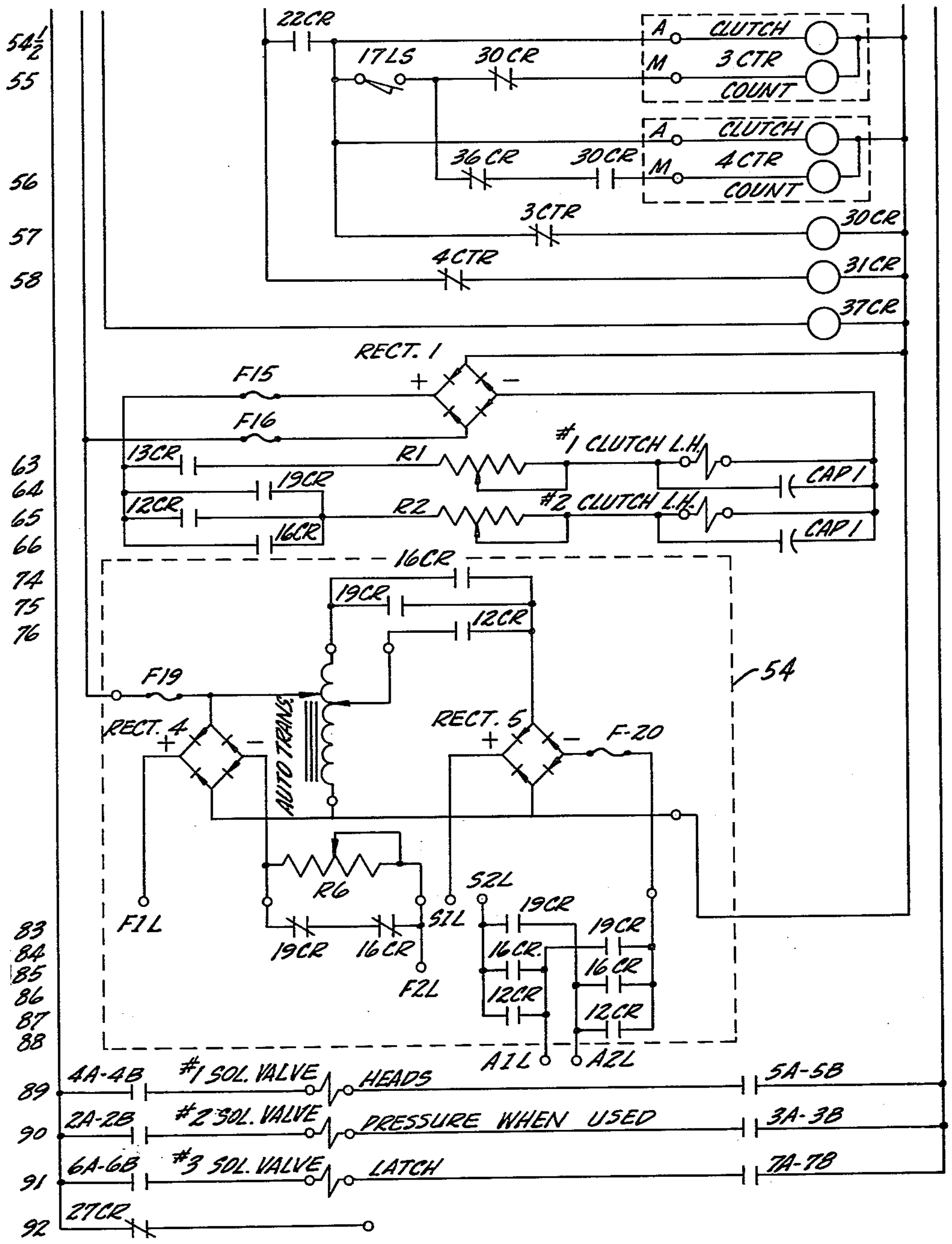

The invention is illustrated diagrammatically in the following drawings wherein:

FIGURE 1 is a diagrammatic illustration of a double-disc grinder with the wheels in grinding position, FIGURE 2 is a diagrammatic illustration of a double-disc grinder, similar to FIGURE 1, with the grinding wheels in dressing position, FIGURE 3 is a wiring diagram of the control circuit used herein, FIGURE 4 is a further wiring diagram of the control circuit, FIGURE 5 is an additional wiring diagram of the control circuit used herein, FIGURE 6 is a chart showing the relationship between the various contacts on a step switch used herein and the particular position of the switch, FIGURES 7, 8 and 9 illustrate terminal strips used in the control circuits shown herein.

For purposes of illustrating the control circuits disclosed herein the double-disc grinder will only be shown diagrammatically. The details of the grinder itself are illustrated in the above-mentioned co-pending application. In FIGURES 1 and 2 spaced quills 10 each mount a rotatable grinding disc 12 having an abrasive face 14. The grinding discs or wheels 12 rotate a fixed distance apart so that the work piece passing therebetween will be ground to a precise dimension. The quill 10 may be supported by inner mounting pads 16 of which there are generally three, altough only one is shown in the drawing, and outer mounting pads 18 again of which there are generally three although only one is shown in the drawings. A spindle 20 is mounted for rotation within each quill 10 and provides the rotational drive for the abrasive grinding discs 12.

Mounted on the top of the quill 10 is an upstanding lug or bracket 22. The lug 22 has an end plate 24 mounted thereon and slidably receives a feed screw 26. The feed screw is keyed to the lug to prevent rotation and is threaded, as at 28, for a purpose hereinafter described. Mounted at the top of the lug 22 is an air cylinder 30 carrying a piston 32 which in turn mounts a spacer block 34. The spacer block 34 is generally U-shaped or horseshoe shaped and is adapted to fit over the feed screw and be positioned between the end plate 24 and a push collar 36 securely mounted on the feed screw 26. The air cylinder 30 and the piston 32 move the spacer block 34 in a vertical direction such that the spacer block may be inserted between the collar 36 and the plate 24 or may be removed from between said members. In FIGURE 1 the spacer block 34 is shown in normal running position, whereas in FIGURE 2 the spacer block is shown in the withdrawn position.

In order to drive the feed screw and hence move the lug, quill and grinding discs, a cross shaft 38 has a worm thereon in contact with the outer surface of a gear 40 which is securely mounted on a nut 42 surrounding a portion of the feed screw. The feed screw and nut may be provided with a ball screw and race assembly of a conventional type so that rotation of the gear and nut cause the feed screw to move.

Mounted at opposite sides of the quill 10 are quill cylinders 44 each of which have a piston rod 46 connected to the quill at 48. The pneumatic quill cylinders are connected at one end to the quill through the connection 48 and are connected at the opposite end to the housing supporting the quill. Such a housing and connection is illustrated in the above-mentioned co-pending application but is not described in detail herein as it does not form part of the present invention.

The cylinders may be used to move the quill in opposite directions as means are provided to reverse the direction of air pressure applied thereto. As described in the above-mentioned co-pending application the grinding discs may be moved inwardly toward each other to a grinding position where they are closely spaced, or they may be moved outwardly away from each other to dressing position. This may be referred to as a rapid transversing movement. FIGURE 1 illustrates the grinding position and FIGURE 2 illustrates the dressing position. A conventional diamond dresser illustrated at 50 and having oppositely directed diamond cutters 52 may be moved down between the abrasive faces for dressing the two abrasive discs.

The quill cylinder normally biases the quill away from the grinding position to remove any possibility of backlash. The quill is biased so that lug 22 and spacer block 34 is held against the collar 36 which in turn is firmly held in place on the feed screw. When a dressing operation is started first, the direction of the air pressure in the quill cylinder is reversed to release the spacer block 34 from between plate 24 and collar 36. Cylinder 30 then moves spacer block 34 to the position of FIGURE 2. Pressure is then again reversed in the quill cylinders 44 to withdraw the quills. The lug 22 slides along the feed screw until end plate 24 contacts collar 36. The feed screw is not rotated. After the dressing operation, the air pressure is reversed in the quill cylinders and the quill and lug more to the left, as shown in FIGURES 1 and 2, until the quill and abrasive grinding discs are once more in grinding position. Then, air cylinder 30 is actuated to lower the spacer block 34 between collar 36 and end plate 24. Thus, the spacer block 34 defines the travel of the grinding disc between grinding and dressing positions and in this sense the opposite sides of the block should be accurately finished.

When using cutters for dressing rather than diamond dressers it is necessary to move the quills to a further outward position. This is done by rotation of cross shaft 38. The wheels are also moved to the wheel change position through the use of cross shaft 38.

Having generally described the grinding disc and the structure associated therewith, it should be pointed out that this invention is concerned with the particular control means for said discs. In particular with the electrical control circuit for intermittently infeeding said discs so that the spacing between abrasive faces is always constant and in addition to the control circuits for moving the quills and the discs to the dressing and wheel change positions. Also the electrical circuits for controlling movement of the dressers, whether they be diamond dressers or cutters, so that the faces of the disc are accurately dressed to predetermined limits.

The first operation described is the micro or incremental infeed which is used to incrementally move the grinding discs together to compensate for the amount of abrasive worn off the grinding faces during operation. Turning to the wiring diagrams of FIGURES 3, 4 and 5, in order to initiate operation of the grinder the reset button in line 1 must be operated and pressure switch P5 (line 1) must be closed indicating that there is pressure to the various air cylinders on the grinder. Once the reset button has been operated 1CRC (line 1) operates and, in effect, locks in the control circuit.

As the two grinding discs or grinding heads are identical only the operation of one of the heads will be described in detail. It should be understood that the other head operates in the same manner and simultaneously. In order to have a micro or incremental infeed, the microinfeed button or switch (line 8) is pushed to energize relay 13CR (line 9) which then locks in through limit switches, 3LS and 2LS (line 10). The energizing of relay 13CR closes its various contacts positioned throughout the circuit. The number 1 clutch (line 63), operated by the closing of the contacts on relay 13CR, is effective to connect one end of cross shaft 38 to a further shaft portion, not shown, which may move into contact with microswitches 6LS and 5LS for a purpose hereinafter described.

Releasing the microinfeed button (line 8) energizes relay 12CR (line 8). Relay 13CR (line 9) remains locked. When relay 12CR is energized its contacts close (lines 76, 87 and 88) starting infeed motor or ratio motor 54 at slow inward speed. Additionally, the energizing of relay 12CR activates the number 2 clutch (line 65) which connects the ratio motor to the cross shaft 38. Infeed continues until limit switch 2LS is tripped by that portion of the cross shaft 38 connected through the number 1 clutch. When limit switch 2LS is tripped both relays 12CR and 13CR are de-energized, releasing clutches 1 and 2 and stopping the ratio motor. Thus, by accurately setting the distance through which the shaft portion connected to the cross shaft 38 moves until it contacts limit switch 2LS, the amount of infeed can be determined. The details of the placement of the limit switch on the grinding apparatus are shown in the above-mentioned co-pending application.

The next operation that will be described is the automatic dressing operation using diamond dressers, such as shown in FIGURES 1 and 2. The terminal strip or fanning strip shown in FIGURE 8 is inserted in the grinder when using a diamond dresser and automatic dressing. The fanning strip connects the wires or terminals of FIGURE 7 as illustrated. The selector switch (line 27) is switched from the run position to automatic dress position. This energizes relay 22CR (line 27). The energizing of relay 22CR shorts out limit switch 2LS (line 10), thus shorting out the microinfeed. Limit switch 3LS is still effective and it is the dress infeed microswitch. In addition the energizing of relay 22CR closes contacts 22CR (line 28) energizing the entire dress circuit.

The dress button (line 28) is then pressed which energizes relay 24CR (line 28). Contacts 24CR (line 40) close moving the step switch to position 2. It should be pointed out at this time that the particular step switch which is used herein is connected such that upon a short being formed through the switch at a particular position, the switch automatically moves to the next position. The pair of contacts illustrated at position 2 (line 41), are for the grinder feeder motor. As the operation of this motor is not being described in conjunction with the dressing means, these contacts are shown as closed and hence the step switch which moves automatically to position 3.

FIGURE 6 illustrates the relationship between the various positions of the step switch and the various pairs of contacts on the step switch. The crosses illustrate what particular contacts are closed at a certain position of the step switch.

When the step switch has moved to postiion 3, contacts *4a*—*4b* (line 89) are closed, as are contacts *5a*—*5b* (line 89) so that number 1 solenoid valve (line 89) is operated. The number 1 solenoid valve reverses the direction of air pressure to the quill cylinder 44 so that the quill moves inwardly to release spacer block 34. At the same time contacts *6a*—*6b* (line 91) and contacts *7a*—*7b* (line 91) also close so that number 3 solenoid valve is operated to activate air cylinder 30 and move the spacer block 34 upwardly out of position between plate 24 and collar 36. The spacer block 34 or latch is moved upwardly until limit switches 6LS and 7LS (line 42) are tripped, thus moving the step switch to postiion 4. When the step switch moves from position 3 to position 4 contacts *4a*—*4b* open, de-energizing solenoid valve number 1, to reverse the air pressure directed to the quill cylinder for moving the quill backward to dressing position, as illustrated in FIGURE 2. When the quill reaches dressing position limit switches 8LS and 9LS (line 44) are closed by contact with the quill thus moving the step switch from position 4 to position 5. As contacts 22CR (line 45) have already been closed there is a short to position 5 and hence the step switch automatically moves to position 6.

When the step switch reaches position 6, contacts *13a*—*13b* (line 31) are closed energizing timers 3TR and 4TR (line 31). 4TR contacts (line 32) close energizing relay 26TR (line 32). Timer 3TR will time out, however, contacts 26CR (line 13) are closed for a sufficient period of time to energize relay 13CR (line 9) thereby activating the head infeed circuit as was previously described. As was described before the grinding head will now infeed a predetermined distance. When the infeed is complete relay 13CR is de-energized hence closing the normally closed contacts of relay 13CR in line 33. The closing of these contacts energizes dresser motor 5MSF (line 35) to start the dressing operation.

The diamond dresser moves in toward the center of the coaxially aligned grinding discs and then moves outward. When the dresser has reached the limit of its inward travel, limit switch 11LS (line 35) is tripped which opens the circuit to 5MSF or the inward feed portion of the dresser motor and energizes 5MSR or, in effect, reverses the dresser motor. The dresser hence reverses and moves outward or toward the outer edge of the grinding disc. When contacts 5MSR (line 38) close the count coil of counter 1CTR (line 37) is energized. When the dresser arm has reached its outward position, limit switch 10LS (line 36) is tripped which opens or de-energizes 5MSR and thus registered one count on counter 1CTR. When switch 10LS, having been tripped by outward movement of the dresser arm, moves to the position shown in the drawings, another infeed cycle is started. Timers 3TR and 4TR are again energized and the sequence of operation described above, including the operation of relay 26CR and relay 13CR, starts another infeed cycle.

The sequence of steps or cycle of infeeding an incremental amount and thereafter dressing off the amount of infeed continues until counter 1CTR counts out or, in other words, continues until there has been a predetermined number of infeed and dressing cycles. When counter 1CTR counts out, contacts 1CTR (line 48) close, moving the step switch from position 6 to position 7.

When the step switch moves to position 7 contacts 14*a*—14*b* (line 32) are opened to prevent energizing of relay 26CR (line 32). This prevents any infeed. The dressing cycle continues, only this time, each dressing operation, consisting of an in movement of the dresser and an out movement of the dresser, is registered on counter 2CTR (line 39). Once counter 2CTR counts out, 5MSF, 5MSR and 2CTR (line 49) all close moving the step switch from position 7 to position 8.

When the step switch is in position 8, contacts 4*a*—4*b* and 5*a*—5*b* (line 89) close to energize solenoid valve number 1 (line 89), reversing the direction of air pressure in the quill and hence moving the quill back toward grinding position. When the grinding head has moved in it will contact limit switches 8LS and 9LS (line 44) which will close and so move the step switch to position 9. Solenoid valve number 3 (line 91) is now de-energized and the latch in the form of a spacer block 32 moves down to the position of FIGURE 1 tripping limit switches 6LS and 7LS (line 42) when it has reached the down position. This moves the step switch to position 12. In position 12 contacts 4*a*—4*b* and 5*a*—5*b* are open and hence solenoid valve number 1 is de-energized so that the air pressure to the quill is reversed whereby the quill and the grinding head is moved back against the latch to remove any possibility of backlash during the grinding operation. This particular feature is described in the above-mentioned co-pending application.

Described above is the sequence of operation when using automatic dressing, such as with diamond dressers. However, in some applications cutters will be used instead of diamond dressers and the operation may not be completely automatic as described but may be partially automatic and partially manual. When dressing with cutters and not utilizing a completely automatic operation, the fanning strip of FIGURE 9 replaces the fanning strip of FIGURE 8 with a consequent rewiring of the terminals shown in the panel of FIGURE 7.

To operate the cutters for dressing, the selector switch (line 27) is turned to automatic dress and the dress button (line 28) is pressed. The sequence of operation is similar to that described in connection with the automatic diamond dressing down through the movement of the step switch to position 5. In this case, the fanning strip for the cutters does not provide a short between wires 218 and 166 (line 45) therefore the step switch will not move from position 5 to position 6 as previously described. When the step switch is in position 5, relay 19CR (line 24) is energized which starts ratio motor 54 for moving the head and quill outward. As relay 22CR (line 27) is closed by moving the selector switch to automatic dress, counter 3CTR (line 55) is now in the same circuit. Each revolution of the portion of the cross shaft connected to cross shaft 38 by clutch number 1 trips limit switch 17LS (line 57) and hence registers a count on counter 3CTR. The ratio motor continues to drive the quill outward until counter 3CTR counts out or until the shaft has turned through a certain number of revolutions. When 3CTR counts out relay 30CR (line 57) closes hence energizing counter 4CTR (line 56).

The dresser arm may now be moved down in between the open grinding faces. It should be pointed out at this time that the ratio motor moves the quill and grinding head outward a sufficient distance to just clear the cutters. Once the cutters have been moved down in between the spaced grinding wheels by means of the dress start button (line 28) the quill may be moved by a suitable hand wheel, not shown in this application but illustrated in the above-mentioned co-pending application, until the abrasive discs just touch the point of the cutters. Each revolution of the cross shaft as the quill moves inward is registered on counter 4CTR by limit switch 17LS (line 55). Once the cutters come in contact with the abrasive discs the dresser is jogged out by pressing the dresser jog-out button (line 35). This dresses or removes one layer from the abrasive face of the grinding wheels. It should be noted that when the dresser jog-out button is pressed to energize 5MSR, relay 35CR (line 36) is energized which in turn locks relay 36CR (line 29) into the closed position. When relay 36CR contacts open (line 56) counter 4CTR is de-energized hence preventing any additional revolutions from being counted or registered on the counter. The operator moves the quill back toward grinding position either manually or by the infeed button as necessary and then presses the dress button so that the dresser arm will make one stroke in and out. In this manner the operator dresses the abrasive faces of the grinding wheels.

When the operator has dressed the wheels to satisfaction the finish dress button (line 52*a*) is pressed energizing relays 28CR (line 52*a*). When relay 28CR is closed its contacts in line 21 close thus energizing relay 16CR (line 20) which starts the ratio motor 54 for moving the quill inward. The activation of relay 28CR brings counter 4CTR once more into the circuit. As the quill moves inward, each revolution of the shaft is counted or registered on 4CTR and when the counter counts out, movement of the quill and the grinding head ceases. The step switch then finishes its cycle, bringing the heads back to the original position with the spacer being inserted as described previously. The two counters, 3CTR and 4CTR can be set for the same number of counts, however it is preferred to have counter 4CTR set for a slightly smaller number of counts or revolutions to compensate for wear of the cutter.

It should be explained at this time that whereas the operation of the particular control means described has been illustrated in conjunction with a double-disc grinder, the same control means and method of dressing may be utilized where a single grinding wheel or a head is moved coaxially to and from a dressing position.

The last operation to be described is the wheel change operation. The operator first turns the selector switch (line 27) to wheel change. The dress button should then be pressed and the grinding heads will open as previously described to the dressing position. As 22CR (line 27) is now open, 22CR contacts (line 45) will stop the step switch at position 5. Relay 23CR (line 27) is energized and 23CR contacts (line 24) close energizing relay 19CR. The closing of 19CR contacts starts ratio motor 54 so that the motor moves the grinding heads outward to the wheel change position. The heads are moved out until limit switches 12LS and 13LS (lines 24 and 25 respectively) are tripped, locking out relays 19CR and 20CR and stopping the ratio motor and hence movement of the grinding heads.

At this point new abrasive faces may be positioned on the grinding wheels.

When relay 19CR is locked out or de-energized, relay 21CR (line 26) is energized hence closing 21CR contacts (line 20). This energizes the head in button so that operating this button energizes relay 16CR (line 20) starting ratio motor 54. This motor runs the head in to the dressing position.

The dress button may now be pressed to activate the dressers for a pass both in and out. The abrasive wheels may be fed either manually or by means of the micro infeed until 16LS (line 36) is tripped. Once this limit switch has been tripped the selector switch is turned to automatic dress and the automatic dressing cycle described earlier in connection with diamond dressing takes place.

At the end of the automatic dressing cycle the grinding heads are automatically returned to grinding position.

In making a wheel change using cutters rather than the automatic diamond dressing system described above the operation is similar to a wheel change with the automatic system except that the dressing portion of the wheel change operation is similar to the dressing operation described in connection with the cutters.

The use, operation and function of the invention are as follows:

Shown and described herein is an improved control means and method for dressing double-disc grinders or the like. In particular the control system is effective to provide a micrometric or incremental infeed prior to each dressing step. Thus, the dressing operation is much more accurate than the type of operation wherein the faces are dressed after which they are moved in. This is especially true if the dressing means are diamond cutters which will dress the abrasive face of a grinding wheel to a very high degree of accuracy.

In one form of operation the dressing cycle is completely automatic. The grinding heads and quills are automatically moved out from the grinding position to the dressing position through the control means described. Once in the dressing position the heads are automatically infed and dressed. This particular cycle is repeated a specified number of times until a predetermined amount of material has been removed from the abrasive faces. There follows an additional cycle of dressing without infeed to finish dress or complete the dressing of the abrasive face. The heads are then automatically returned to grinding position such that the space between grinding heads is the same as prior to dressing.

Of particular importance is the sequence of steps in the dressing method wherein the heads are infed prior to dressing. In other words, the heads are infed after which an amount substantially equal to the amount of infeed is dressed off by the diamond cutters. Thus it is possible to always know the exact position of the abrasive face and hence enable the operators to move the abrasive grinding discs back to the predetermined grinding position. Limit switches are used to stop the movement of the abrasive faces once they have reached said predetermined position.

When using cutters for dressing, which have a tendency to wear which a diamond dresser does not have, and in addition when using a sequence of steps which is not completely automatic, the heads are returned to the predetermined grinding position by accurately measuring the distance the heads move away from the grinding position and then returning the heads to through approximately the same distance. The method of measurement consists in counting the number of revolutions of the shaft which moves the heads. For example, in one application, each revolution of the shaft indicates movement of .005 inch. After the heads have been moved apart a sufficient distance to permit movement of the cutters between the heads, the heads may be moved in a slight amount to place the abrasive faces exactly against the cutters. The abrasive faces are again dressed by means of first infeeding and then dressing off in an amount approximately equal to the distance the face was infed. Once the dressing operation is complete the heads are moved back toward grinding position a distance equal to the original distance the heads moved out minus any distance the heads may have been moved in to contact the cutters. Accordingly, it is possible to provide a method whereby the grinding heads are dressed and moved back into the proper predetermined relationship for grinding work pieces.

In addition to the dressing operation the control circuit of the invention provides means for making a wheel change and then returning the new abrasive faces to the predetermined relationship for proper grinding. The wheel change operation includes a dressing step once the discs have been replaced so that the abrasive faces may be trued and aligned for proper grinding.

Whereas the preferred form of the invention has been shown and described herein, it should be realized that there are many modifiications, substitutions and alterations thereto within the scope of the following claims.

I claim:

1. A method of dressing a pair of coaxially disposed grinding wheels having abrasive grinding faces and positioned to move coaxially between a grinding position and a dressing position including the steps of moving said wheels coaxially in opposite directions to said dressing position, moving each of said wheels an incremental distance in the opposite direction, dressing said abrasive grinding faces, while holding them axially stationary, by passing a dresser first from the outside of the wheels to the center, and then from the center to the outside and then repeating the successive steps of incrementally moving said grinding wheels back towards grinding position and dressing said abrasive faces for a predetermined number of said cycles, thereafter performing additional dressing operations on said abrasive grinding faces.

2. The method of claim 1 further characterized by the steps of counting each infeed and dressing cycle and terminating said cycles after a predetermined number thereof, counting each additional dressing operation after said infeed and dressing cycles have been completed, and continuing said additional dressing operation a predetermined number of times.

3. A method of dressing a pair of coaxially disposed grinding wheels having abrasive grinding faces and positioned to be driven coaxially between a grinding position and a dressing position by a drive shaft including the steps of moving said wheels coaxially in opposite directions to said dressing position, measuring the distance so moved, by counting the number of revolutions of said drive shaft moving each of said wheels an incremental distance in the opposite direction, without counting the number of drive shaft revolutions dressing said abrasive grinding faces, then repeating the cycle of incrementally moving said grinding wheels back towards grinding position and dressing said abrasive faces for a predetermined number of said cycles, and then moving said grinding wheels back towards grinding position through a distance generally equal to that measured when moving toward dressing position.

4. In a double-disc grinder or the like, a pair of grinding wheels coaxially disposed with their grinding faces opposite each other, means for moving said wheels axially back and forth toward each other between an inner grinding position and an outer dressing position, means for incrementally feeding said grinding faces toward each other, means for dressing the grinding wheels after each incremental infeed, means for counting the number of infeed and dressing cycles, means for stopping said infeed and dressing operation after a predetermined number of cycles, means for thereafter dressing said grinding faces without incremental infeed, and means for counting the number of dressing operations starting after the infeed and dressing cycles terminate.

5. The structure of claim 4 further characterized by means for moving said grinding wheels axially to a still further outward wheel change position.

6. In a double-disc grinder or the like, a pair of grinding wheels coaxially disposed with their grinding faces opposite each other, means for moving the wheels axially back and forth toward each other between an inner grinding position and an outer dressing position, a first counter for measuring the movement of each grinding wheel in its movement from grinding position out to dressing position, a second counter for measuring the movement of the grinding discs in moving from dressing position back into grinding position, means for dressing the faces of the grinding discs while in dressing position, means for incrementally feeding the discs toward each other during such dressing, and means for de-energizing the second counter during such incremental movement during dressing so that such movement will not be registered on the second counter.

7. The structure of claim 6 further characterized in that the second counter is preset for fewer counts than the first counter to compensate for wear of the dressing means.

8. The method of claim 1 wherein said wheels move through a precise distance when moving from the grinding position to the dressing position, and with the further step of moving said wheels back through said same precise distance to return them to the final grinding position.

References Cited in the file of this patent

UNITED STATES PATENTS

| | | |
|---|---|---|
| 2,882,651 | Price | Apr. 29, 1959 |